US 8,832,181 B2

(12) United States Patent
Merissert-Coffinieres et al.

(10) Patent No.: US 8,832,181 B2
(45) Date of Patent: Sep. 9, 2014

(54) DEVELOPMENT AND DEPLOYMENT OF MOBILE AND DESKTOP APPLICATIONS WITHIN A FLEXIBLE MARKUP-BASED DISTRIBUTED ARCHITECTURE

(75) Inventors: Patrick Merissert-Coffinieres, Issy les Moulineaux (FR); Alain Dinkespiler, Paris (FR); Alejandro Daniel Rosenblatt, Toulouse (FR); Alexandra-Madalina Stroe, Maisons-Alfort (FR)

(73) Assignee: Ellad Technologies, Inc., Cupertino, CA (US)

( * ) Notice: Subject to any disclaimer, the term of this patent is extended or adjusted under 35 U.S.C. 154(b) by 0 days.

(21) Appl. No.: 13/025,025

(22) Filed: Feb. 10, 2011

(65) Prior Publication Data
US 2011/0131273 A1    Jun. 2, 2011

Related U.S. Application Data

(63) Continuation of application No. 12/054,344, filed on Mar. 24, 2008, now Pat. No. 7,912,935, which is a continuation of application No. 12/295,028, filed on Dec. 5, 2005, now abandoned, which is a continuation of application No. 10/116,310, filed on Apr. 2, 2002, now abandoned.

(51) Int. Cl.
*G06F 15/16* (2006.01)
*H04L 29/08* (2006.01)
*G06F 9/445* (2006.01)
*G06F 9/44* (2006.01)
*H04L 29/06* (2006.01)

(52) U.S. Cl.
CPC ............... *G06F 9/445* (2013.01); *H04L 67/34* (2013.01); *H04L 67/02* (2013.01); *G06F 8/00* (2013.01); *H04L 69/329* (2013.01); *H04L 67/04* (2013.01); *H04L 67/42* (2013.01)
USPC ............................... 709/203; 709/226; 703/2

(58) Field of Classification Search
USPC ........................................ 709/203, 226; 703/2
See application file for complete search history.

(56) References Cited

U.S. PATENT DOCUMENTS

| 6,173,316 B1 | 1/2001 | De Boor et al. |
| 6,589,290 B1 | 7/2003 | Maxwell et al. |
| 6,647,544 B1 | 11/2003 | Ryman et al. |

(Continued)

OTHER PUBLICATIONS

Non-Final Office Action mailed on Jun. 6, 2005, for U.S. Appl. No. 10/116,310, filed Apr. 2, 2002, 17 pages.

(Continued)

*Primary Examiner* — Kyung H Shin
(74) *Attorney, Agent, or Firm* — Morrison & Foerster LLP

(57) ABSTRACT

A computer program product embodied in a computer-readable medium is configurable to accomplish execution of an application that is specified and encoded in a markup-based descriptor language. The product includes client runtime computer code configured to cause a client computer device to process the markup-based descriptor language to deploy an application to accomplish execution of the application. The client runtime computer code is further configured to process the markup-based descriptor language to selectively configure the client computer device to deploy the application so as to accomplish execution of the application by the client computer device stand-alone or by the client computer device in cooperation with a server to which the device is connectable via a network connection.

16 Claims, 17 Drawing Sheets

(56) References Cited

U.S. PATENT DOCUMENTS

| | | | |
|---|---|---|---|
| 6,654,949 | B1 | 11/2003 | Fraenkel et al. |
| 6,785,880 | B1 | 8/2004 | Beisiegel et al. |
| 7,139,686 | B1* | 11/2006 | Critz et al. ............ 703/2 |
| 7,152,109 | B2* | 12/2006 | Suorsa et al. ............ 709/226 |
| 7,912,935 | B2 | 3/2011 | Merissert-Coffinieres et al. |
| 2002/0116455 | A1* | 8/2002 | Mitchell et al. ............ 709/203 |
| 2002/0178244 | A1 | 11/2002 | Brittenham et al. |
| 2003/0193994 | A1* | 10/2003 | Stickler ............ 375/150 |
| 2006/0075070 | A1 | 4/2006 | Merissert-Coffinieres et al. |
| 2009/0164604 | A1 | 6/2009 | Merissert-Coffinieres et al. |

OTHER PUBLICATIONS

Non-Final Office Action mailed on Sep. 25, 2007, for U.S. Appl. No. 11/295,028, filed Dec. 5, 2005, 17 pages.

Non-Final Office Action mailed on Sep. 29, 2009, for U.S. Appl. No. 12/054,344, filed Mar. 24, 2008, 19 pages.

Non-Final Office Action mailed on Apr. 14, 2010, for U.S. Appl. No. 12/054,344, filed Mar. 24, 2008, 24 pages.

Notice of Allowance received for U.S. Appl. No. 12/054,344, mailed on Nov. 10, 2010, 7 pages.

* cited by examiner

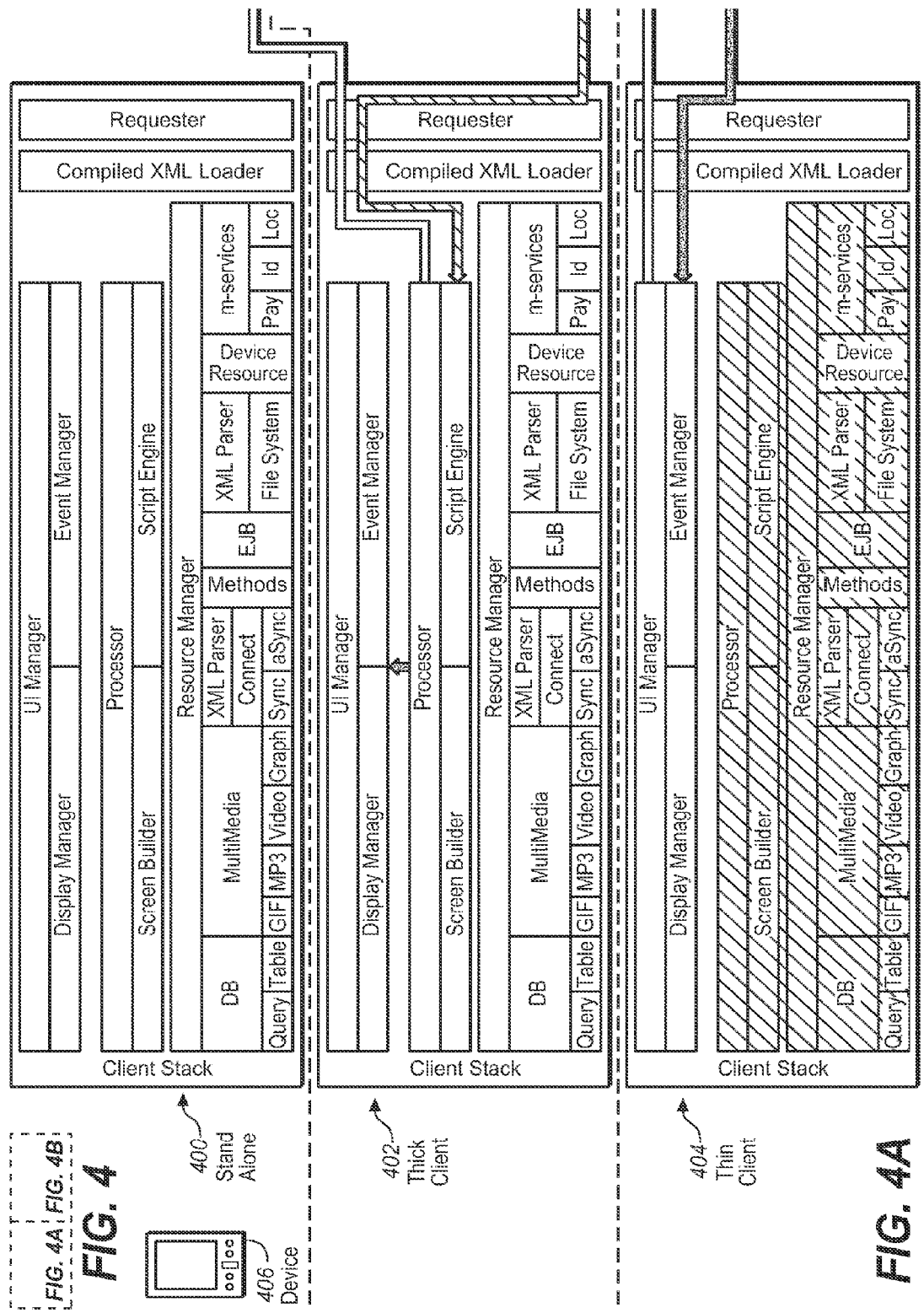

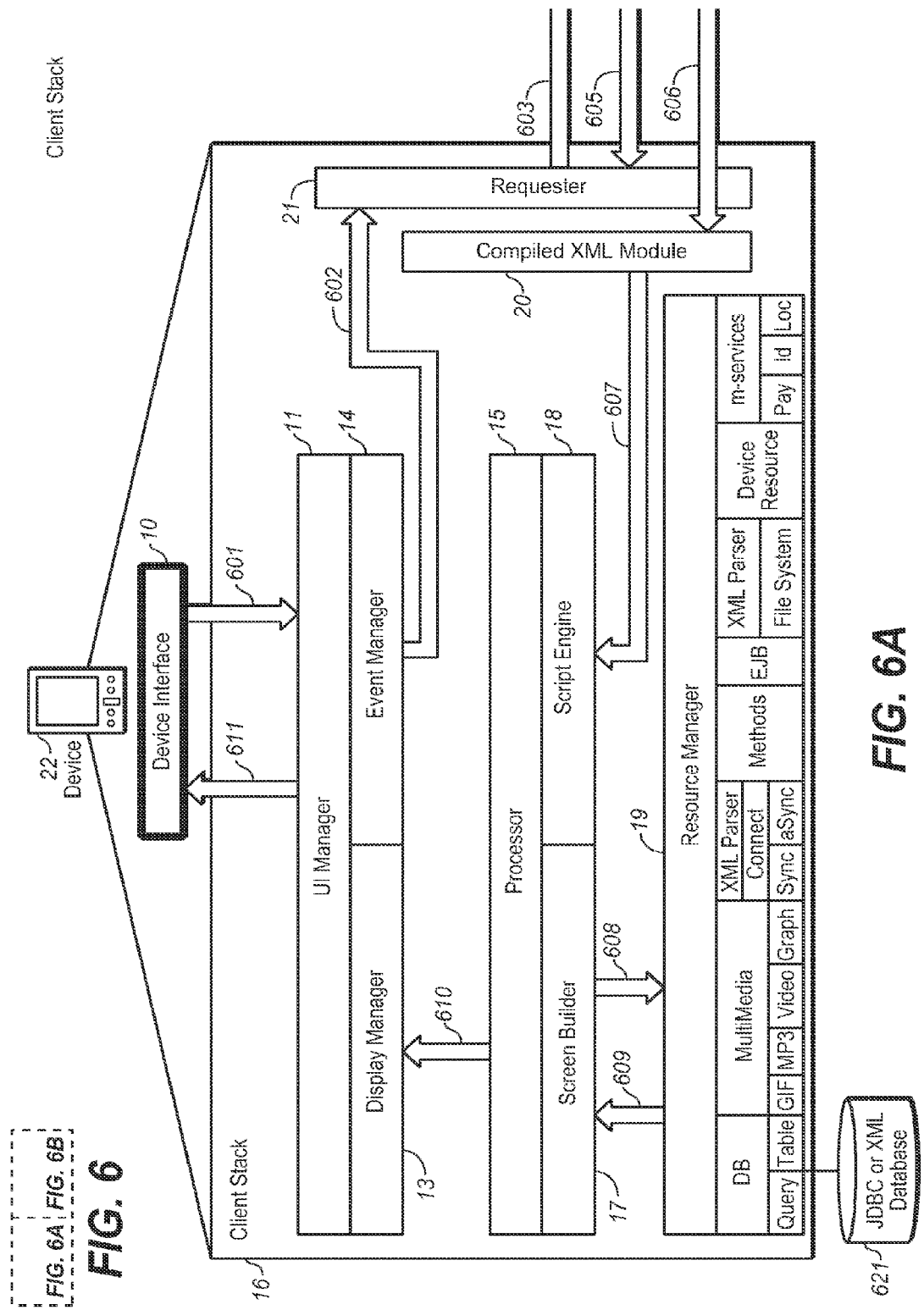

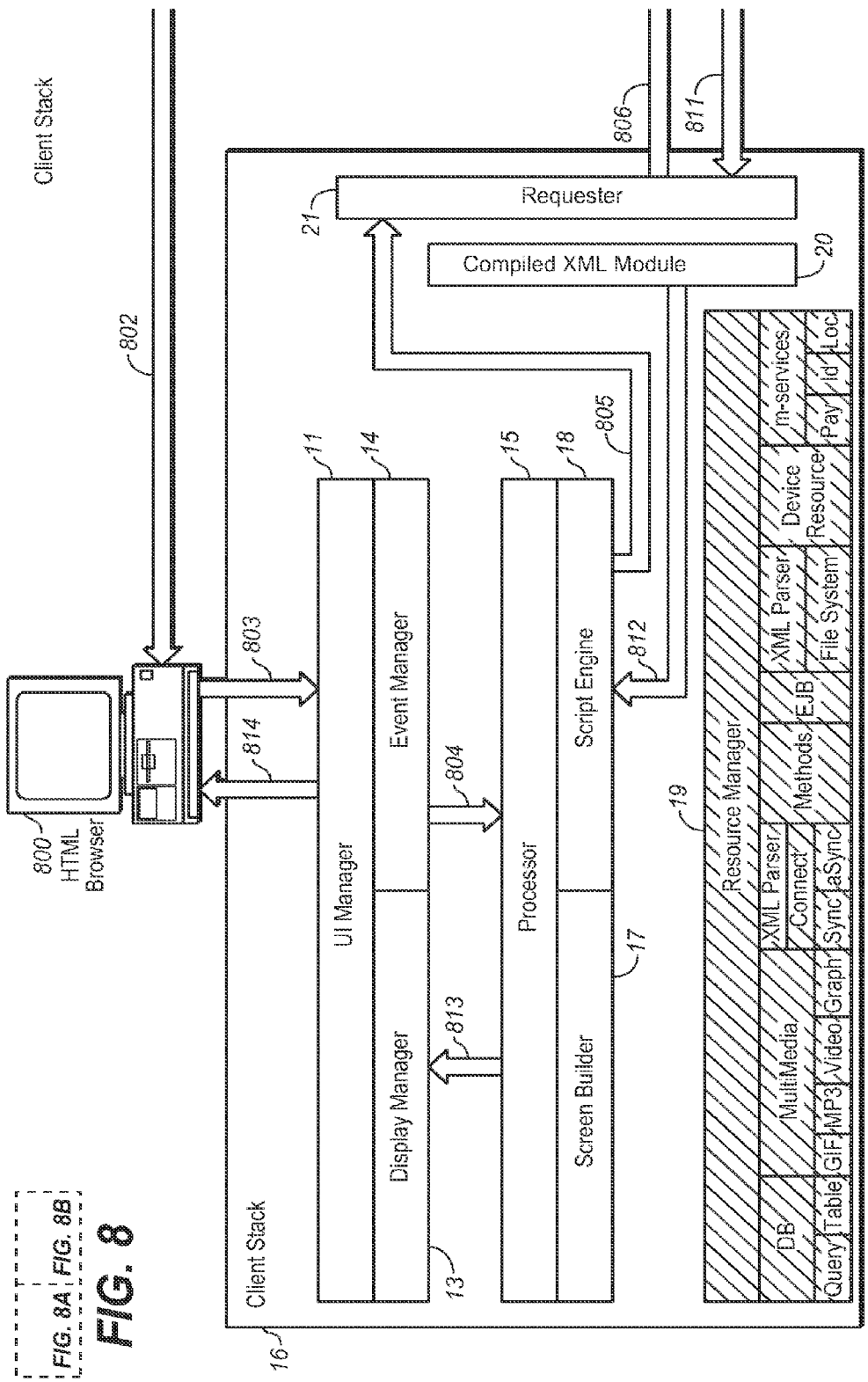

FIG. 10

```
<?xml version='1.0' encoding='UTF-8'?>
<window id="ticket" orient="horizontal">
    <box id="entry" orient="vertical" text-align="center">
1030─    <text value="Select a station"/>
     1023─<menulist id="departure">
            <for datasource="stations" cursor-name="s">
       1021─    <menuitem value="?s.field('STATION_NAME')"
station_id="?s.field('STATION ID')"/>
            </for>
        </menulist>
    </box>
    <box orient="vertical">
        <button value="OK" width="80"/>
        <button value="CANCEL" width="80"/>
    </box>
</window>
```

1001

1024

1022

Visual Form Specification, example1.xml

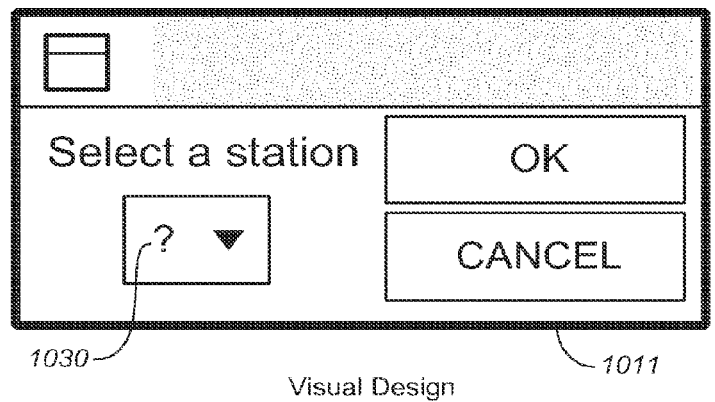

1030 — 1011

Visual Design

DEVELOPMENT AND DEPLOYMENT OF MOBILE AND DESKTOP APPLICATIONS WITHIN A FLEXIBLE MARKUP-BASED DISTRIBUTED ARCHITECTURE

CROSS-REFERENCE TO RELATED APPLICATION

This is a continuation application of U.S. patent application Ser. No. 12/054,344, filed Mar. 24, 2008, which is a continuation application of U.S. patent application Ser. No. 11/295,028, filed Dec. 5, 2005, which is a continuation application of U.S. patent application Ser. No. 10/116,310, filed Apr. 2, 2002, the specifications of which are incorporated herein by reference in their entirety.

TECHNICAL FIELD OF THE INVENTION

The present invention is in the field of developing and deploying applications and services for a full range of devices, scaling from mobile phones to computer desktops, within a flexible markup based distributed architecture.

BACKGROUND OF THE INVENTION

As wireless computing devices become more ubiquitous, the demand for value-added mobile applications and solutions to deliver these applications increases. Enterprises expect new mobile applications to seamlessly integrate with the existing corporate information system, thus granting access to existing resources and services to highly mobile workers. Examples include accessing legacy applications and connecting to enterprise databases through wireless devices.

Mobile applications may have challenges such as:
Accessing a mobile application from different kinds of devices, for example from a PDA or a desktop computer, depending on the location of the user. PDAs and desktops differ in several ways, including form factors, operating systems and connectivity.
Running a mobile application on a mobile device continuing to work offline, in the case of a broken connection. An offline behavior utilizes access to local resources.
A mobile application accessing services published by some Web Services provider implementing Web Services standards, including SOAP, WSDL and UDDI.

Deploying mobile applications in such heterogeneous environments greatly increases the complexity of the solutions, and presents many unresolved challenges. These challenges in turn affect the development of applications, as well as ongoing maintenance. Some issues to address are:
Open standards compatibility. Proprietary solutions are unlikely to be practical in such heterogeneous environments. The solution should fit the emerging Web Services standards, including SOAP, WSDL and UDDI.
Multi-platform deployment. The same service may be accessed from different kinds of devices and different communication protocols may be used.
Ease of modification. Since the markets change quickly, especially emerging markets like the wireless applications market, it is desirable that smart applications are easy and quick to modify.
Adaptable deployment. No single deployment model fits all contexts. The suitable deployment model depends on several factors, such as device resources, security requirements and application characteristics. Deployment models typically range from a thin client connected to a server, to a stand-alone running application.
Access to local resources. Mobile devices cannot rely exclusively upon server side resources, since the connection with a server cannot always be guaranteed. Furthermore, it can be costly to continually maintain a connection to a server when it is only occasionally required.
Enhanced user interface. Required to improve the user experience.

Solutions like HyperText Markup Language (HTML) combined with HyperText Transfer Protocol (HTTP), Wireless Application Protocol (WAP), pure Java programming, Application Servers, and proprietary Software Development Kits (SDKs), each address a subset of these challenges, but more comprehensive solutions are desired.

HTML and WAP are open standards and may be deployed on multiple platforms. Services developed with these standards may be easily modified, since they becomes immediately available to the client devices when deployed on the server. Unfortunately, the deployment model of HTML and WAP is a rather rigid thin client model and a connection to a server must remain typically available during the execution of the application. This may be costly and even impractical, should the connection to the server be interrupted unexpectedly. Another drawback is that these solutions allow little access, if any, to local resources. Finally, the user interface is rather modest, at best.

Another solution mentioned above is pure Java programming. Although Java is quite portable, and is considered to some extent as an "open standard", there are in fact multiple Java standards, including J2ME MIDP, Personal Java, and Java 2 Standard Edition. Thus, deploying a Java application on different platforms may require rewriting it several times, which implies involving highly-skilled developers. The same problem arises when modifying an application. Java provides good means of implementing a deployment model targeted to a specific architecture, accessing local resources and providing effective User Interfaces. Unfortunately, each deployment model generally requires a specific Java program, thus making it unfeasible to dynamically adapt a given application to new architectural requirements.

Proprietary SDK's provided by mobile device manufacturers are quite comparable in capabilities and drawbacks to the Java programming approach, but have the additional drawback of not being open standards. The use of such proprietary solutions entails a commitment to one particular (inflexible) solution, which in turn restricts the ability to later port an application to other mobile devices. Should the chosen solution at some point no longer meet the requirements of the user, it could be extremely costly to implement a completely new solution.

Application servers, and especially Java application servers based on the Java 2 Enterprise Edition (J2EE) standard, promote several architecturally significant separations of concerns. One architectural feature is a variation on the HTML approach, namely Java Server Pages (JSP). JSPs are targeted to improve the separation between interaction logic and business logic on the server side, but have the same limitations as traditional HTML architectures on the client side. Another architectural feature is the distinction between the development phase and the deployment phase for an application, thus allowing some flexibility for adapting to the underlying technical architecture. However, the deployment process is typically only concerned about server-side deployment characteristics, including transactions, security and database access. The distribution of processing and resources between the client and the server are not addressed by this solution.

SUMMARY OF THE INVENTION

A computer program product embodied in a non-transitory computer-readable storage medium is configurable to accomplish execution of an application that is specified and encoded in a markup-based descriptor language. The product includes client runtime computer code configured to cause a client computer device to process the markup-based descriptor language to deploy an application to accomplish execution of the application. The client runtime computer code is further configured to process the markup-based descriptor language to selectively configure the client computer device to deploy the application so as to accomplish execution of the application by the client computer device stand-alone or by the client computer device in cooperation with a server to which the device is connectable via a network connection.

DETAILED DESCRIPTION

Figure 1:
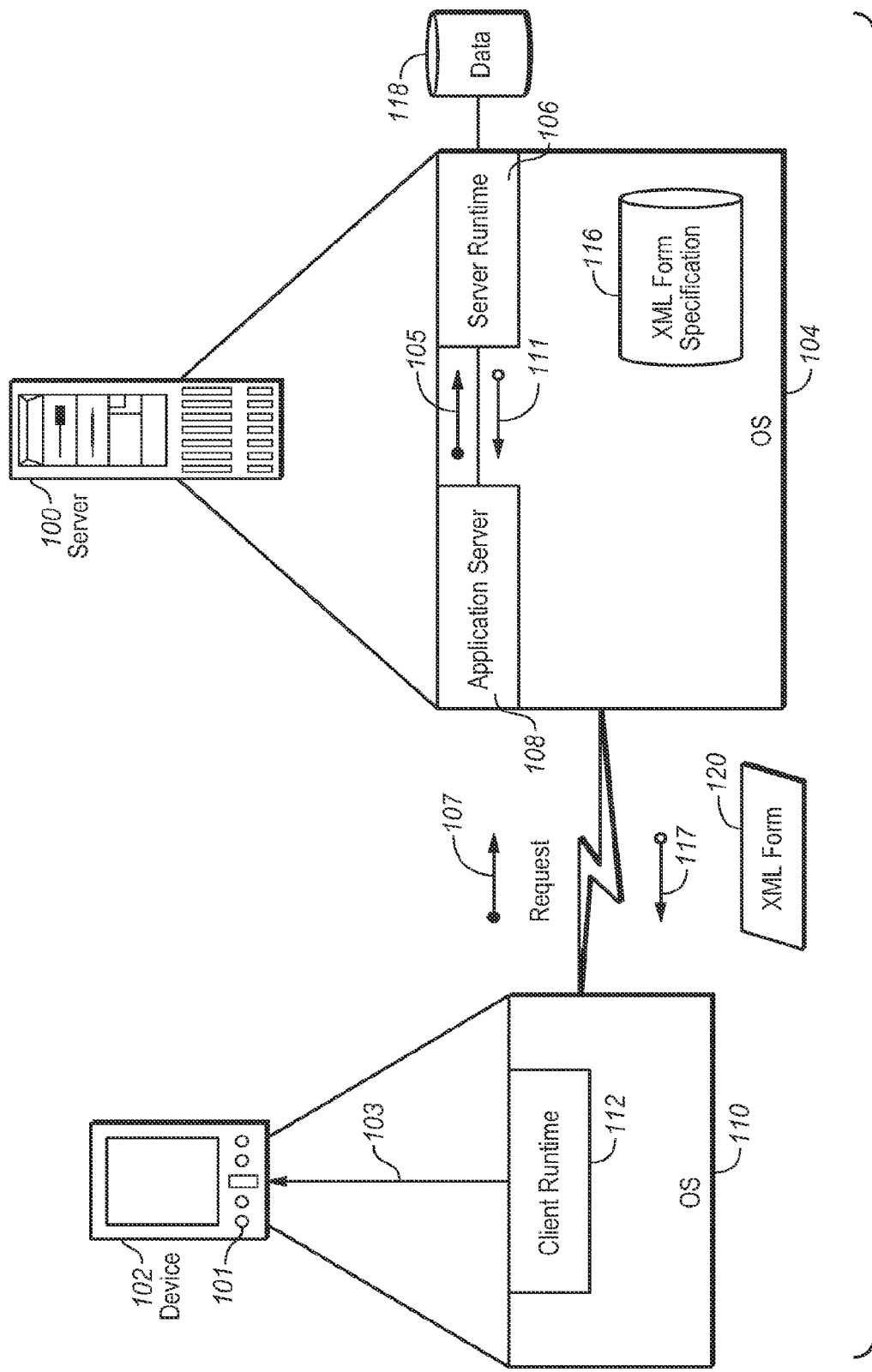
FIG. 1 illustrates an outline of the runtime architecture, in accordance with an embodiment of the present invention.

A comprehensive flexible solution, based on a markup language like XML, for developing smart mobile applications and services, and for deploying them in heterogeneous environments. Smart mobile applications can be used in a connected or disconnected mode and they can access and process resources locally or on a server. According to one aspect, a flexible client-server architecture is targeted to run smart mobile applications. The applications and the deployment architecture are specified within markup-based descriptors. The supported architecture specifications range from a standalone client running an entire unconnected application, to a thin client managing the User Interface with the business logic of the application running on the server. In between, many combinations of client and server side processing may be specified. The characteristics of the architecture may be dynamically modified, thus leading to increased flexibility in the deployment. Mostly, the markup-based descriptors are forms specifying the User Interface of the application, the behavior of the application in response to the interactive events, the business logic of the application, and the location where the resources are to be found and processed. The behavior of the application is defined in a scripting language, which is given access to the resources of the device, including access to methods written in a language like Java, either on the client or on the server.

For example, a client runtime system displays interactive screens, or forms, interacting with specific server components running within an application server. The client runtime retrieves a form specification, either locally or from the server. When the form is accessed from the server, it may be preprocessed therein. Otherwise, it is preprocessed on the client. The preprocessing of a form specification is a construction process, where the actual form to be displayed is constructed as specified in the form specification, possibly using available resources like databases to populate the actual form. The client runtime parses and processes the actual form to generate the User Interface on the device, and then handles the interactive events. The client runtime is typically installed on the computing client device, which may be a smart phone, a PDA, or a desktop computer, but it can also be downloaded on demand as an applet into a browser. The server software is typically installed on a server running a Java application server. The entry point in the server software is a servlet using an XML configuration file generated by the Designer. When a client device sends a request, the servlet analyzes the request, prepares the XML formatted response, and sends it back to the client. The preparation process may include preprocessing of a form specification, and retrieval of deployed forms and/or data from backend systems.

According to another aspect, a development and a deployment process is provided for smart applications and services. For example, the development and deployment process may be performed in three steps. The first step is the user interface and interaction design step, and produces the interactive specification of the forms. Within this step, databases and other resources are managed and accessed as abstract references, without any indication about their physical location or other implementation-dependent characteristics. The second step is the deployment definition step, that is, defining where and how the form specifications, resources and data are to be deployed on the client and the servers. The third step corresponds to the actual deployment on the target platforms. This separation provides means for deploying the same application across multiple kinds of distributed environments. The environments may differ by the operating system of the client device, by the resources available on the client or on the server, and by the characteristics of the connection. The result of the development and the deployment process is a set of markup documents describing the architecture and the behavior of the resulting application.

As an example of this development and deployment process, an easy-to-use Rapid Application Development (RAD) designer tool may be provided for application developers. The designer tool running on the developer's computing device provides the developer with tools for each step of the development and deployment process, from the visual definition of screens to the testing of full-fledged client-server applications. With the designer tool, the developer can define and edit the screen visually. The designer tool creates the XML files required by the client and by the server.

The same application may thus be deployed on different deployment models and platforms, providing increased flexibility (useful, for example, for wireless implementations). For example, if the application is designed to support the sale force of a large corporation equipped with both wireless PDAs and desktop computers, different types of deployments may be required. In the office, the user may expect to access the application through a thick connected model, using the full processing power of a desktop computer and the high bandwidth of the local network. While outside the office, the user may access the application, for instance to check the status of an order, from either a PDA using a thin connected model or from a browser through the Internet by using an applet deployment mode. When a connection is not available, the application may operate in a stand-alone mode, thus allowing the user to enter an uncommitted order or estimate a total price.

FIG. 1 illustrates, at a broad level, the runtime architecture of one embodiment in accordance with the present invention. The runtime architecture is implemented on a computing client device 102 and a server 100, connected through a connection link 117. The illustrated embodiment corresponds to a "thin client" runtime configuration.

The computing client device 102 may include two or more layers. The operating system 110 interfaces to the hardware and handles the low level management of the resources on the device, such as memory, storage, and user input. A Java Virtual Machine is considered an extension of the operating system, abstracting the device's resources into the Java standard, and providing a standard programming platform across devices. A third layer is the client runtime 112, providing part of the client side functionality. The server 100 may comprise a Java J2EE compatible application server 108, which manages the services available on the server. The server runtime 106 based on a Java servlet provides part of the server side functionality in accordance to the present invention. The communication link 117 may be an Internet connection based on the HTTP protocol.

When, through an interaction 101 with the computing client device 102, a user requests access to a form from a service located on the server 100, the client runtime 112 sends a request 107 to the server 100 using the available communication link and protocol 117. On the server 100, the application server 108 analyzes the request and forwards it to the server runtime 106. The server runtime processes the request, recognizes it as a form request, retrieves the requested form specification stored in an XML file 116 and additional data from external resources 118 as appropriate, and combines them to construct the preprocessed XML form 120, which is passed back to the client device 102. The client runtime 112 then processes the XML form and generates 103 the corresponding User Interface-on the device's display.

This general architecture described with reference to FIG. 1 illustrates a deployment with a thin client profile where the construction of the form occurs on the server and no local storage is used on the client. However, other deployment profiles may be employed. The following deployment profiles will be later discussed in more detail:

Stand-alone: the form specifications are stored, and the displayable interactive forms constructed and processed on the client, and no connection to a server is utilized.

Thick connected client: the form specifications are retrieved from a server, but the displayable interactive forms are constructed and processed on the client. Local resources, such as local databases may be involved.

Thin Client: the form specifications are stored on the server. The displayable interactive forms are constructed on the server and the preprocessed forms are then passed to the client. The client handles the processing of the events once the form is on the device, and no access to client resources is utilized.

Applet deployment: the runtime is not installed on the client; it is downloaded on request from the server and runs inside a browser.

The named deployment profiles are not fixed during the execution of a given application. For example, the frequently used forms of an application may run in a stand-alone mode, and the less frequently used ones may be deployed in a thin or thick client mode. Furthermore, the present invention provides means for dynamically changing the deployment profile during the execution of an application, thus leading to highly flexible architectures.

Figure 2:
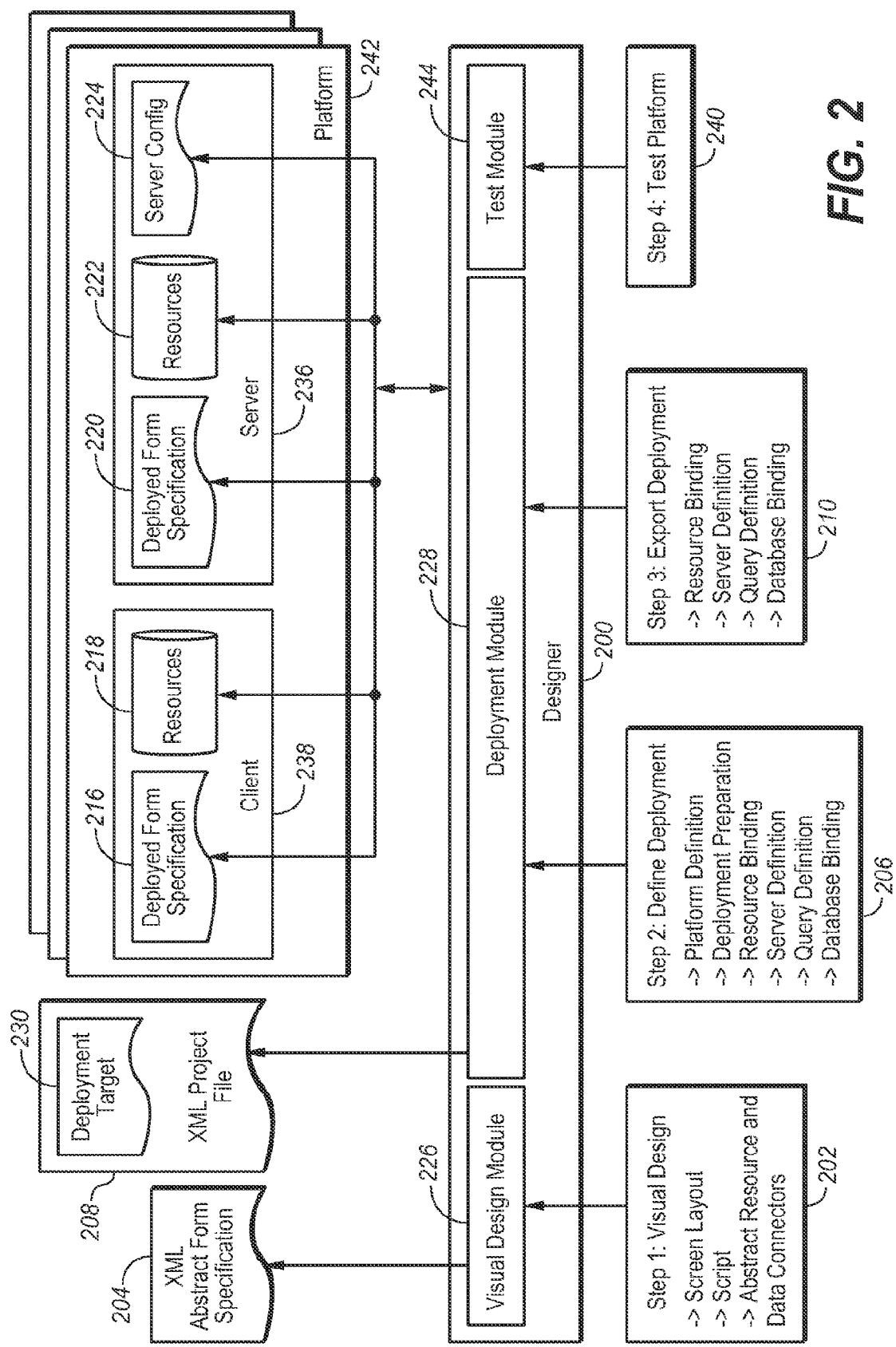
FIG. 2 illustrates an outline of the development and deployment process, in accordance with an embodiment of the present invention.

FIG. 2 illustrates, at a broad level, an embodiment of the development and deployment process in accordance with the present invention. A Rapid Application Development (RAD) designer tool 200 running on the developer's computing device is provided. The designer tool 200 comprises three modules: the visual design module 226, the deployment module 228, and the test module 244. The process is carried out in four major steps: the visual design step 202, the deployment definition step 206, the export deployment step 210, and the test platform step 240.

The visual design step 202 includes defining the abstract form specifications 204 of the application. An abstract form specification is stored as an XML document. The developer designs the visual aspect of the application's forms, by interacting with the visual design module 226, typically by positioning visual components on the screen. The developer may specify the interactive behavior of each visual component through script code, as required. Capability is provided for script code to access external resources as abstract references, delaying the binding to the actual resources until the deployment definition step 206. As a result, the visual layout and behavior of the applications are specified independently of the target platforms. External resources the script code can manipulate include Java methods, images and databases. While presenting the visual aspect of a form, the designer tool 200 generates an XML representation 204 containing the full specification of the abstract form, including the interactive behavior of the form. The developer may choose to perform part or all of the tasks of the visual design step 202 by directly editing this file, using the text-editing feature of the visual design module 226.

During the deployment definition step 206, the developer defines one or more deployment targets 230 for the current application using the deployment module 228. The characteristics of the deployments for an application are stored in an XML document, namely the project file 208. Each deployment target 230 corresponds to a specific platform 242, and comprises the description of the client profile and the accessed servers. For each abstract resource referenced during the visual design step 202, the developer specifies its actual location and settings.

During the export deployment step 210, the developer actually deploys the required files on the client device 238 and the server 236, using the deployment module 228 of the designer tool 200. When the developer requests the deployment module 228 to export the deployment, the designer tool 200 creates all the files required by the deployment and copies the files and the resources either to the client or to the server according to the deployment definition.

During the test platform step 240, the developer tests the application in the context of each of the platforms 242 defined during the previous development steps, using the test module 244.

Figure 3:
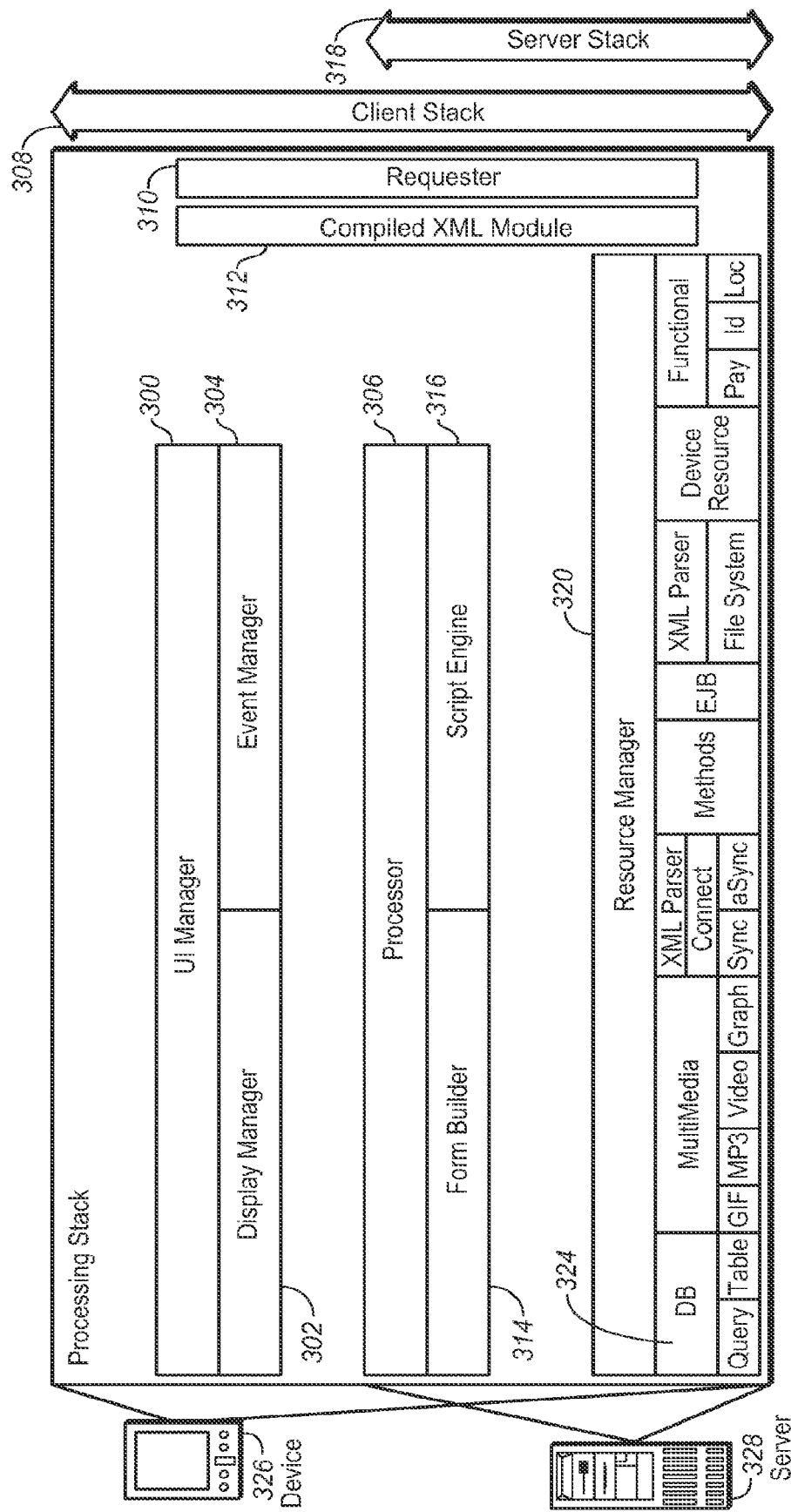
FIG. 3 illustrates the processing runtime client and server stacks, in accordance with an embodiment of the present invention.

FIG. 3 illustrates the client and server processing runtime stacks of various architecture embodiments. The processing stack comprises three principal layers: the resource manager 320, the processor 306, and the User Interface (UI) Manager 300. Two types of stacks are defined: the client stack 308, which includes the three layers named above, and the server stack 318 which excludes the UI Manager 300. By providing similar processing stacks on the client device 326 and on the server 328, improved flexibility in the deployment of applications, is provided since most of the applications' logic may be run uniformly on either the client or on the server.

Within the processor 306, the form builder 314 handles the transformation of form specifications into displayable interactive forms. The form builder 314 analyzes the form specification to check if additional resources are required, including data, image or methods. The requests for the resources are passed to the resources manager 320, as needed. For example, the form specification may specify that a visual grid be filled with data extracted from a database table. The form builder 314 is in charge of performing this task. The developer may use script code within the form specification to define how the form may be constructed, making the construction process more flexible. If the form contains script code, the script engine 316 compiles it.

The UI Manager 300 interacts with the input and output capabilities of the client device 326, such as screen, keyboard, touch screen, sound card or mouse. These elements are specific to the device and are managed by the operating system of the device. The display manager 302 handles the creation of the visual layout of the forms, using the visual controls available on the client device, such as buttons, text fields or grids, as expressed in the displayable interactive form created by the form builder 314. When interest for an event has been registered within a form, the event manager 304 is in charge of notifying the corresponding component of the form whenever the event occurs, and if script code has been associated with the event on the component, the script engine 316 is in charge of running the corresponding code.

The resource manager 320 receives the requests for external resources, either from the processor 306 or from the event manager 304. The resource manager 320 includes connectors 324 to access the different types of resources. Available resources include, for example:

Databases
    Table: a table from a database, such as JDBC and XML databases
    Query: an SQL query on a JDBC database or an XML query to an XML file
Multimedia
    Image file: a file containing an image
    Multimedia stream: a link to a video or sound streaming server or to a file containing video or sound data
    Graphics
Network Files
    XML file: an XML document stored as a file, which is parsed into a Document Object Model (DOM) tree
Methods
    A Java class: a user defined class implementing some complex business logic
    EJB: Enterprise Java Beans
    File System: access to the local storage
Other device resources
    Device specific resource (IrDA, bar code)
Functional resources
    Payment: secure payment
    Identification: secure identification
    Location service: a service providing the geographical location of the device When the returned resource is an XML document, the resource manager 320 parses the XML file and returns the DOM representation of the XML document.

The requester 310 handles the communications between the client and the server. The exchange of data is structured essentially in the form of XML messages, either in a text format or a compiled format. The compiled format is managed by the compiled XML module 312, and is more efficient, as the size of the transferred data is reduced. Additionally, it saves the trouble of translating objects into XML on the server and the reverse on the client.

Figure 4B:
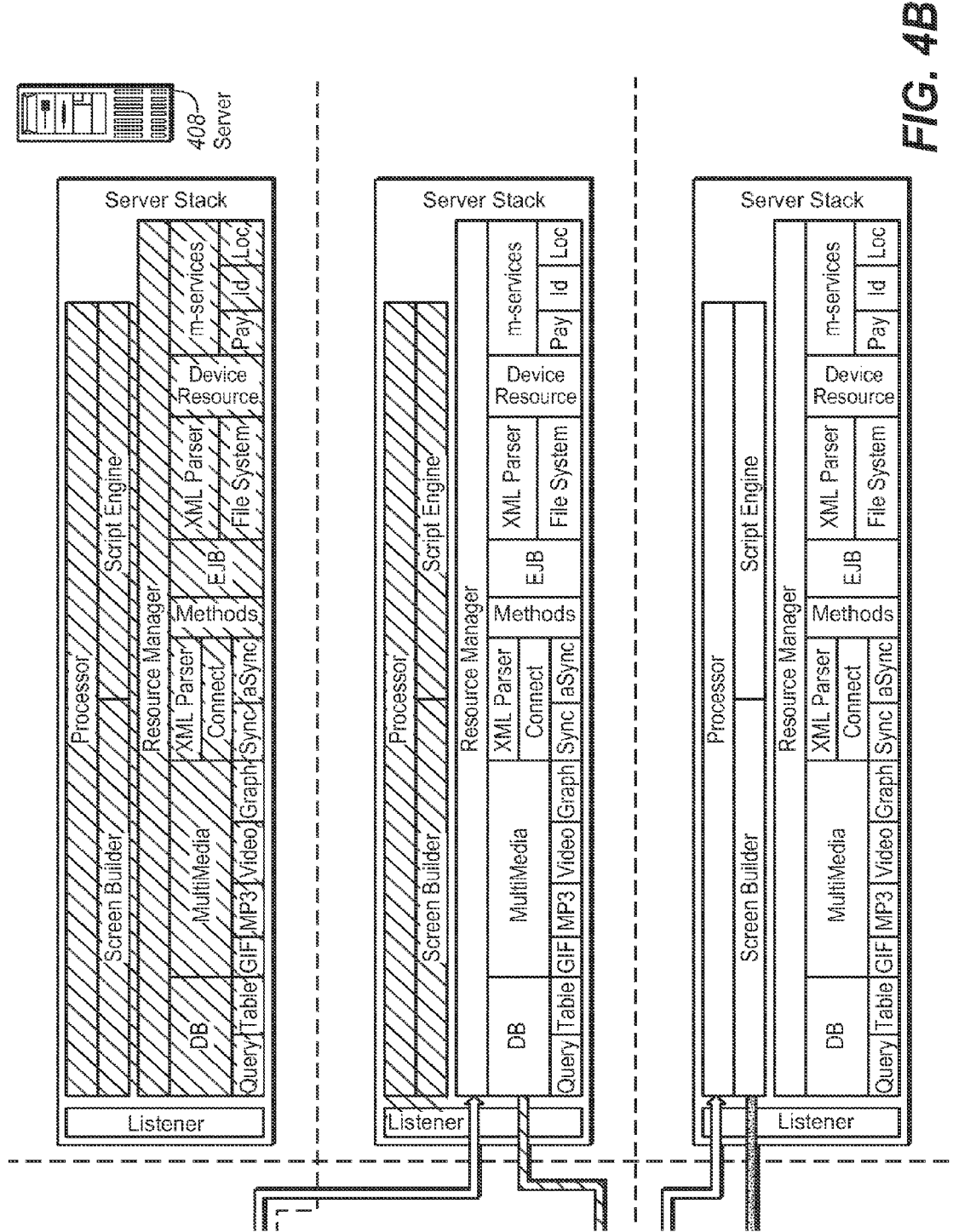
FIG. 4 illustrates a description of three major deployment profiles supported by preferred embodiments of the present invention.

FIG. 4 shows a broad description of the three primary deployment profiles. Each of these profiles will be later described in a more detailed fashion, in FIGS. 5, 6, 7. An additional specific profile, namely the applet profile, represents an example of a mix of the three primary profiles, and is illustrated in FIG. 8:

Thin Connected Client 404: On the server 408, the resource manager retrieves the deployed form from the server storage. The processor on the server 408 retrieves additional resources, if necessary, and processes the form. The processor then sends the processed form to the UI manager on the client device 406, which generates the interface on the device's display.

Thick connected client 402: On the server 408, the resource manager retrieves the form specification from the server storage and sends the form specification to the processor on the client device 406. On the client device 406, the processor retrieves additional resources if necessary, processes the form specification and passes the processed form to the UI manager, which generates the interface on the device's display.

Stand-alone 400: On the client device 406, the resource manager retrieves the form specification from the local storage resource and passes the form specification to the processor. The processor retrieves additional resources if necessary, processes the form specification and passes the processed form to the UI manager, which generates the interface on the device's display.

In each of these modes, including the stand-alone mode, external data can be incorporated through a connector to an external resource. For example, the client device 406 may query a network database or an XML data server on the web.

An additional mode, the applet deployment mode, can be thought of as a combination of the thin and the thick connected client profiles. However, in this case, the client runtime is not an application but an applet running inside a web browser supporting Java. With this model, the user can access the same application without installing specific runtime software on the client. The use of an applet constrains the deployment, because standard restrictions for applets apply, such as restricted access to local resources and to servers.

The process of presenting a form on the client device is now described within an embodiment of an architecture. The process will be illustrated for each of the main deployment profiles described above in FIG. 4. In the following figures, thick arrows represent the flow of information between stack layers. Notice that, in some embodiments, the grayed layers in the figures represent layers that are actually available on the computing system, although they are not used in the represented deployment profile. Alternatively, in some embodiments, the grayed layers may be absent.

Figure 5A:
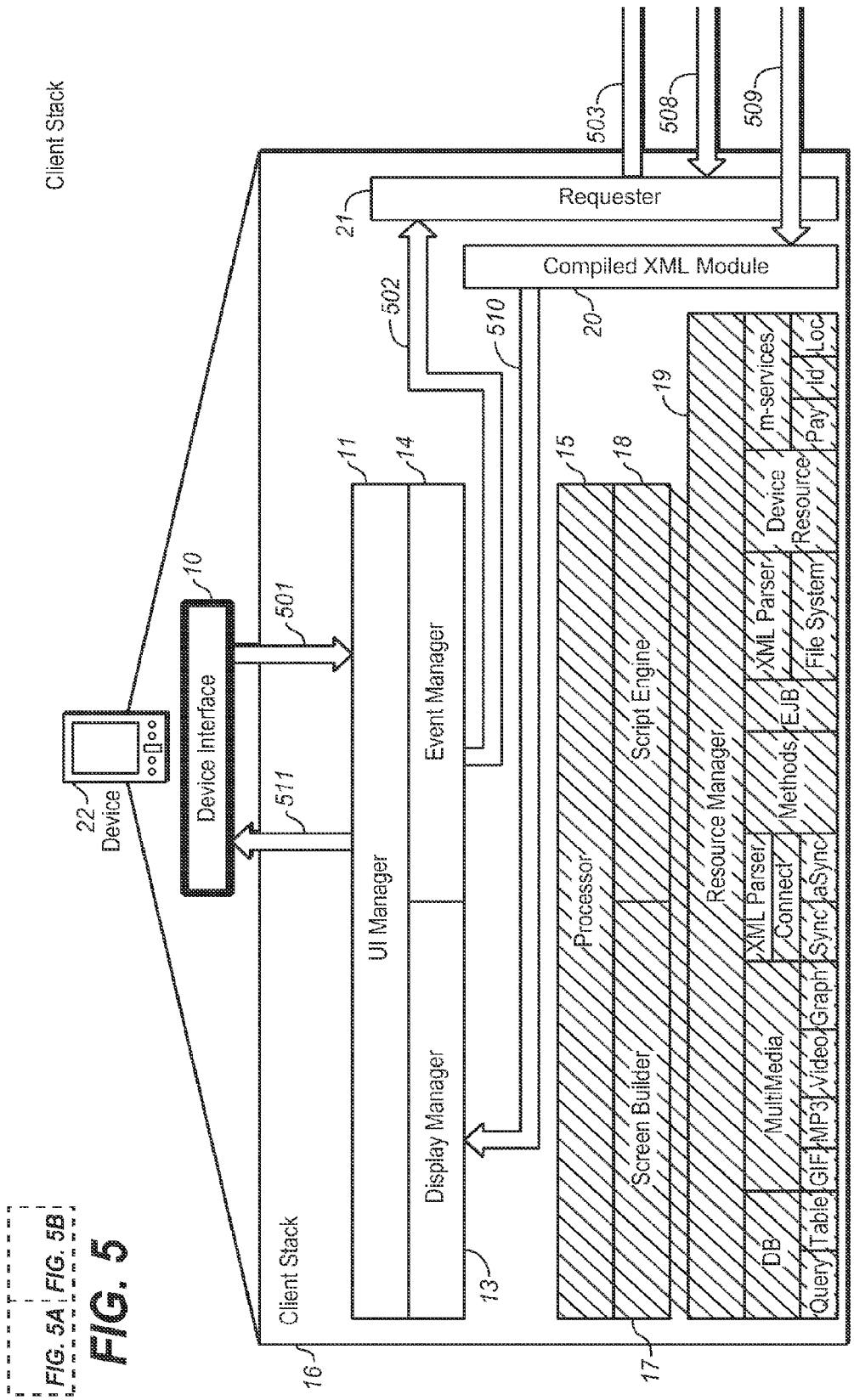
FIG. 5 illustrates the flow of information within the client and server stacks of an embodiment of the present invention, for the thin connected profile.
Figure 5B:
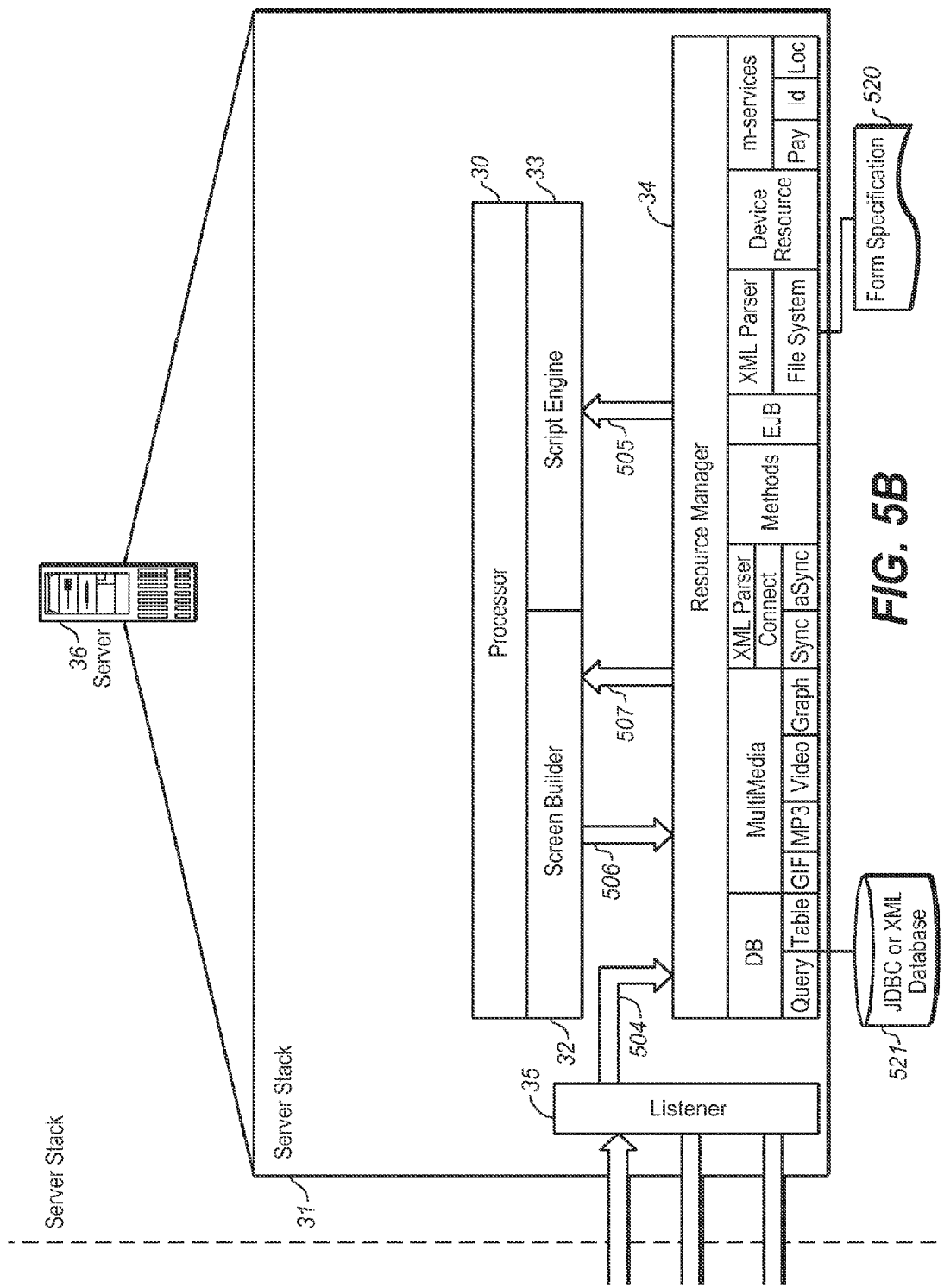

FIG. 5 illustrates the flow of information within the client and server stacks, for the thin connected profile.

501 The process starts when the user raises an event on the device interface 10, associated with an action provoking the presentation of a new form.

502 The event manager 14 intercepts the event and sends the request to the requester 21.

503 The requester 21 transmits the request as an XML message to the listener 35 on the server 36.

504 The listener 35 analyzes the request and sends a command to the resource manager 34 to retrieve the XML file 520 containing the form specification. The resource manager 34 then parses the XML document into a DOM tree.

505 The parsed DOM tree of the form specification 520 is passed to the processor 30. The screen builder 32 uses this DOM tree to construct a new DOM tree representing the displayable interactive form. During this processes, the script engine 33 may be invoked in order to execute the construction of script code if any.

506 As part of the construction process, the processor 30 may invoke the resource manager 34, requesting some data from a database 521 to populate the displayable interactive form.

507 The processor integrates the data in the form as specified in the form specification 520.

508 The listener 35 gets the DOM tree representing the visual form constructed by the processor 30, generates the XML representation of the visual form and sends it back to the requester 21. The requester then uses an XML parser to construct a DOM tree representing the displayable interactive form.

509 Alternatively, the listener 35 may return a compiled version of the visual form to the compiled XML module 20 of the client device 22, which in turn constructs a DOM tree representing the displayable interactive form.

510 The DOM tree is passed to the UI Manager 11, which generates the corresponding. User Interface controls.

511 The form is displayed on the device's interface.

Figure 6B:
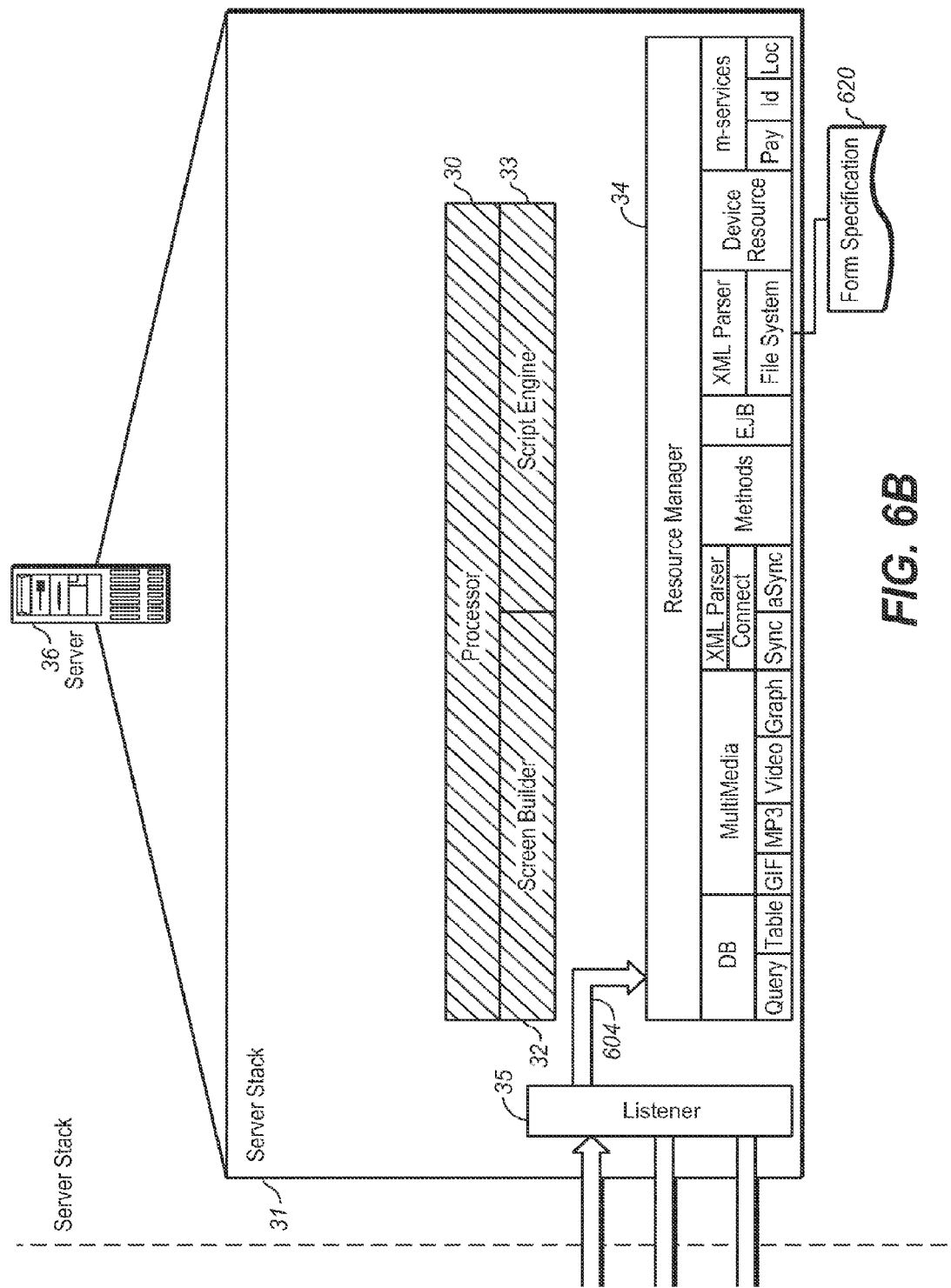
FIG. 6 illustrates the flow of information within the client and server stacks of an embodiment of the present invention, for the thick connected profile.

FIG. 6 illustrates the flow of information within the client and server stacks, for the thick connected profile.

601 The process starts when the user raises an event on the device interface 10, associated with an action provoking the presentation of a new form.

602 The event manager 14 intercepts the event and sends the request to the requester 21.

603 The requester 21 transmits the request to the listener 35 on the server 36

604 The listener 35 analyzes the request and sends a command to the resource manager 34 to retrieve the XML file 620 containing the form specification.

605 The listener 35 gets the XML document representing the form specification 620 and sends it back to requester 21. The requester then uses an XML parser to construct a DOM tree representing the form specification.

606 Alternatively, the listener 35 may return a compiled version of the form specification to the compiled XML module 20 of the client device 22, which in turn constructs a DOM tree representing the form specification.

607 The parsed DOM tree of the form specification is passed to the processor 15. The screen builder 17 uses this DOM tree to construct a new DOM tree representing the displayable interactive form. During this processes, the script engine 18 may be invoked in order to execute the construction script code if any.

608 As part of the construction process, the processor 15 may invoke the resource manager 19, requesting some data from a database 621 to populate the displayable interactive form.

609 The processor then integrates the data in the form as specified in the form specification 620.

610 The DOM tree is passed to the UI Manager 11, which generates the corresponding User Interface controls.

611 The form is displayed on the device's interface.

Figure 7A:
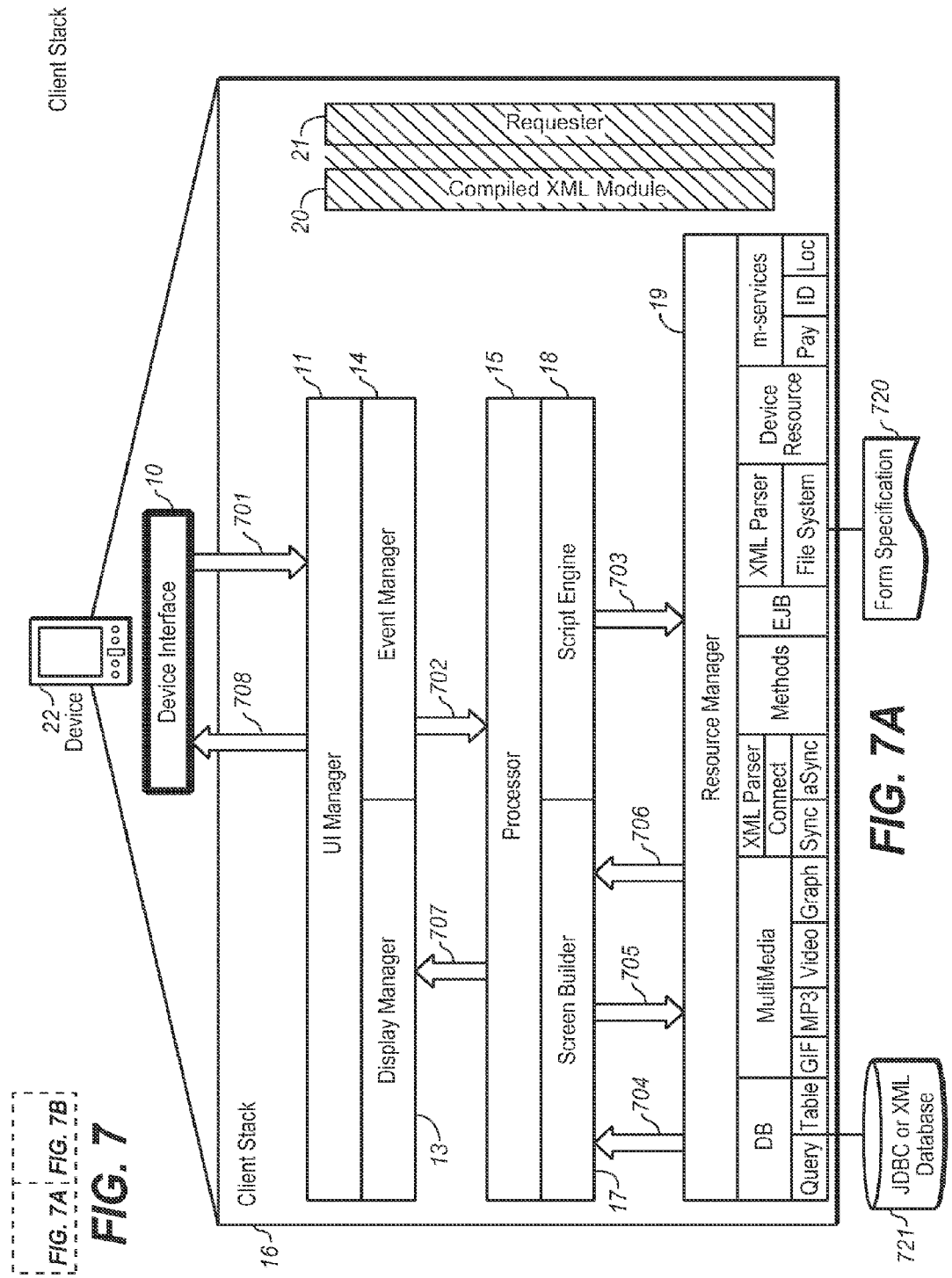
FIG. 7 illustrates the flow of information within the client stack of an embodiment of the present invention, for the stand-alone profile.
Figure 7B:
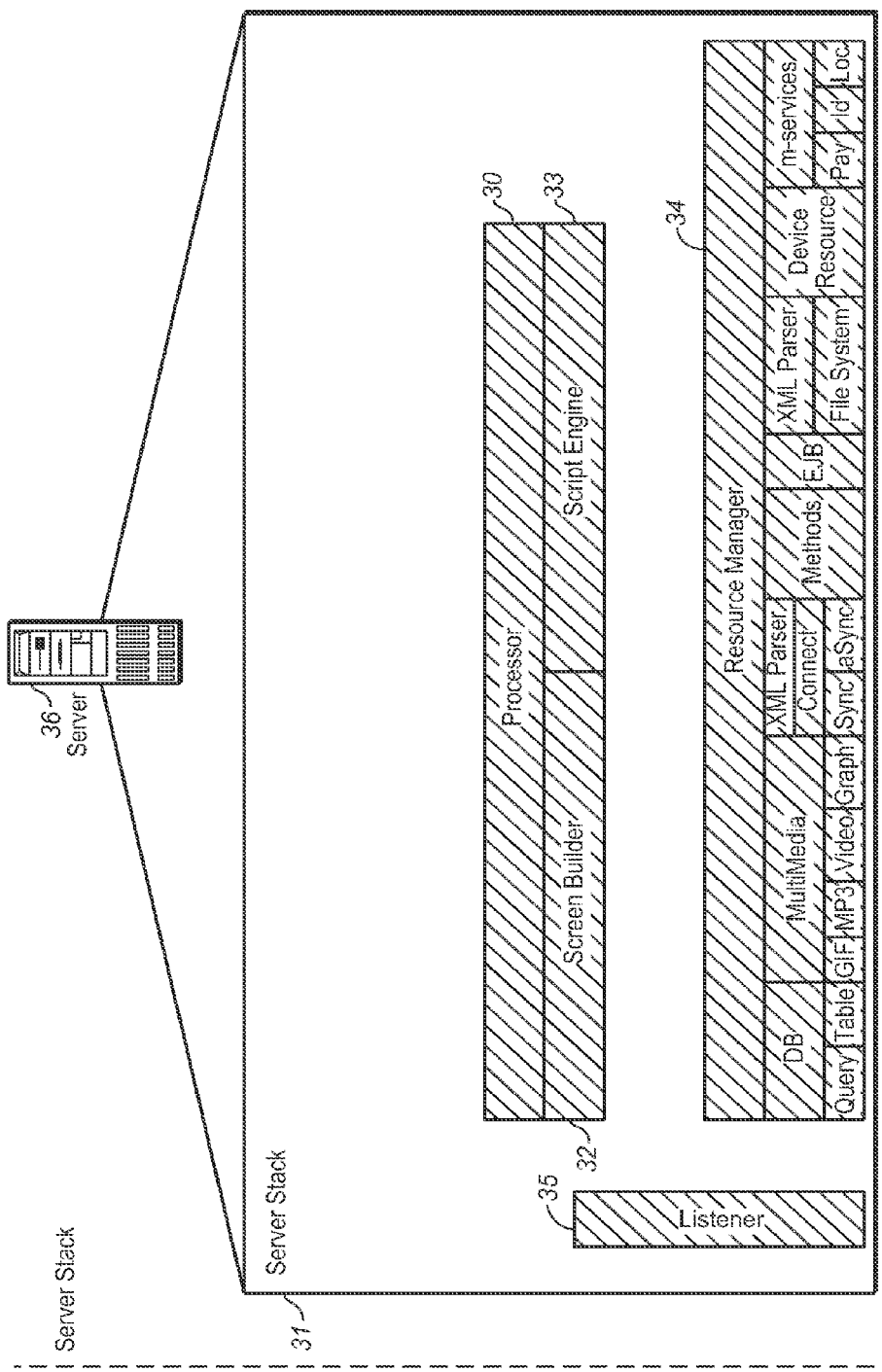
Figure 8B:
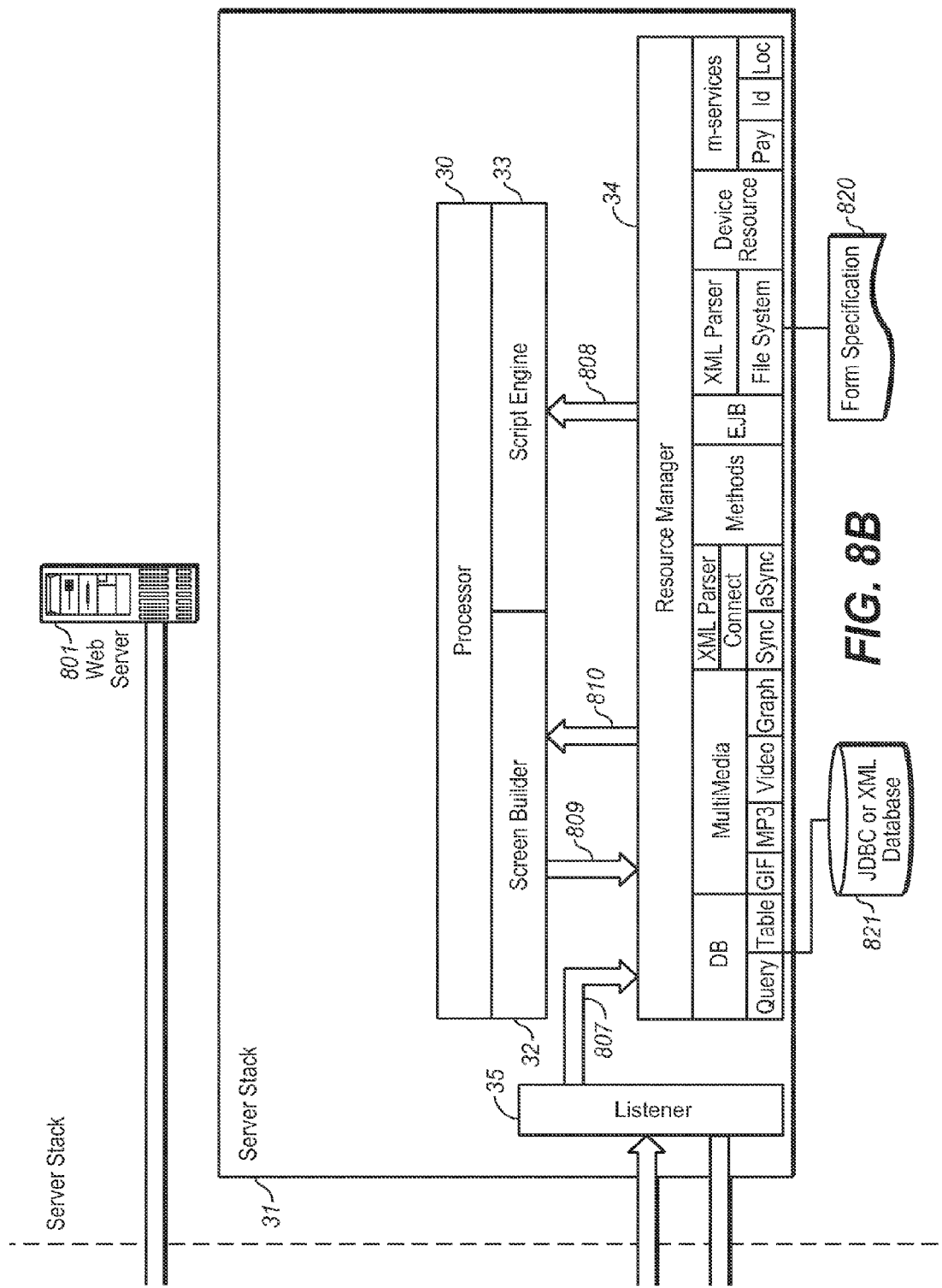
FIG. 8 illustrates the flow of information within the client and server stacks of an embodiment of the present invention, for the applet profile.

FIG. 7 illustrates the flow of information within the client stack, for the stand-alone profile.

701 The process starts when the user raises an event on the device interface 10, associated with an action starting the execution of script code.

702 The event manager 14 intercepts the event, gets the script code associated with the event, and passes it to the processor 15. The script engine 18 executes the script code.

703 Within the execution of the script code, a new form is utilized. A command is sent to the local resource manager 19 requesting to retrieve the local XML file 720 containing the form specification, which is parsed into a DOM tree.

704 The parsed DOM tree of the form specification is passed to the processor 15. The screen builder 17 uses this DOM tree to construct a new DOM tree representing the displayable interactive form. During this processes, the script engine 18 may be invoked in order to execute the construction script code, if any.

705 As part of the construction process, the processor 15 may invoke the resource manager 19, requesting some data from a database 721 to populate the displayable interactive form.

706 The processor integrates the data in the form as specified in the form specification 720.

707 The DOM tree is passed to the UI Manager, which generates the corresponding User Interface controls.

708 The form is displayed on the device's interface.

FIG. 8 illustrates the flow of information within the client and server stacks, for the applet profile. The client runtime runs within a Java compatible HTML browser 800 and the server 801 is a web server.

802 The browser loads the applet client runtime code from the web server 801. The client runtime then runs within the browser's JVM.

803 The user raises an event on the HTML browser 800, associated with an action starting the execution of script code.

804 The event manager 14 intercepts the event, gets the script code associated with the event, and passes it to the processor 15. The engine 18 executes the script code.

805 Within the execution of the script code, a new form is required. A command is sent to the requester 21 requesting to retrieve a form from the server.

806 The request is transmitted to the listener 35 within an HTTP request to the web server 801.

807 The listener 35 analyzes the request and sends a command to the resource manager 34 to retrieve the XML file 820 containing the form specification. The resource manager 34 then parses the XML document into a DOM tree.

808 The parsed DOM tree of the form specification is passed to the processor 30. The screen builder 32 uses this DOM tree to construct a new DOM tree representing the displayable interactive form. During this processes, the script engine 33 may be invoked in order to execute the construction script code if any.

809 As part of the construction process, the processor 15 may invoke the resource manager 34, requesting some data from a database 821 to populate the displayable interactive form.

810 The processor then integrates the data in the form as specified in the form specification 820.

811 The listener 35 gets the DOM tree representing the visual form constructed by the processor 30, generates the XML representation of the visual form and sends it back to the requester 21. The requester then uses an XML parser to construct a DOM tree representing the displayable interactive form.

812 The script that started the loading process of the form may perform some additional initializations, further manipulating the DOM tree.

813 The DOM tree is passed to the UI Manager 11, which generates the corresponding User Interface controls.

814 The form is displayed on the device's interface.

It should be noted that the applet profile is just one example of mixing the main profiles illustrated in FIGS. 5, 6 and 7. Capability is provided for mixing these profiles in many other ways. That is, a given application running on a given client device may combine the behavior of the three profiles. For example, an application on a PDA device may be developed to run in a thin client mode when connected to the corporate server within an intranet, thus taking advantage of real-time data, as illustrated in FIG. 5. Alternatively, when the same application recognizes the unavailability of a valid network connection, it may automatically revert to a stand-alone mode, using a local database that has been automatically synchronized during the connected mode. The same application may then run anywhere, such as at a customer's site.

Figure 9:
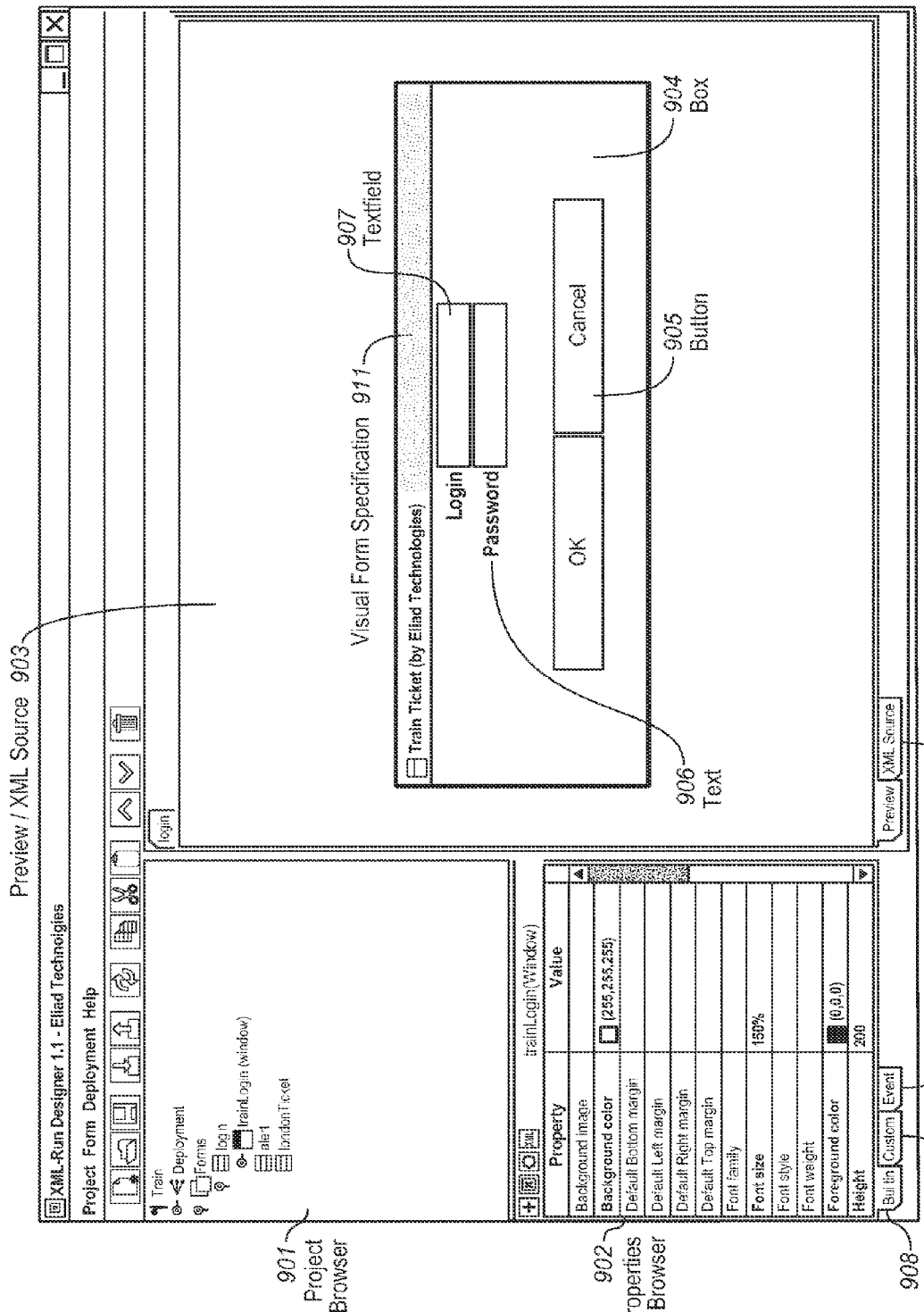
FIG. 9 illustrates an embodiment of a visual design module of the present invention

By reference to FIG. 2, an embodiment of the present invention comprises a visual design module 226, used by the developer during the visual design step 202. FIG. 9 illustrates with more details of one example of a visual design module, in which the visual design module may comprise a project browser panel 901, a properties browser panel 902, and a preview and XML source panel 903.

The developer uses the building elements available from the visual design module to create the forms. For example, the following building elements may be provided:

Box 904: A container for other objects.
Bulletinboard: A container for other objects, which may be placed at arbitrary locations.
Button 905: An action initiator.
Checkbox: A Boolean indicator.
Grid: A container for tabular data. Sub-objects include columns and rows.
Image: A container for a picture.
Menulist: A drop-down selection list of menu items
Spring: A flexible spacing element to be used between other objects.
Text 906: characters and labels.
Textfield 907: An entry field.
For: A loop element to integrate data from a data source A building element may be given specific attributes, such as background color and font size through the properties browser 902. Such built-in attributes are available for each building element and are presented within the built-in attributes tab 908. Custom attributes may also be added to an element within the custom tab 909.

To define the behavior of the form, scripts may be added to the events presented within the event tab 910 of the properties browser. A building element has an associated list of built-in events that may be linked to script code. The script code may define the interaction code, the business logic and the computations required to process the event.

External data may be used to customize the screen during the construction phase of a form; a for building element may be used for this purpose. Examples include populating a list of values in a menulist element or a grid element, with data extracted from a database table. Alternatively, the external data may be accessed by some script code executed during the processing of an event. One example includes checking a username and password against a credentials database table when a user validates a login form.

When writing script code, the developer accesses the data sources and other resources like images as abstract resources, without specifying the physical location and connectivity properties of the resources. The mapping to actual resources is done in a later step. There is no means, during this phase, to state whether the resource will be located on the client device or on the server. This is a feature that allows a given application to be deployed on several different deployment targets.

The visual design module translates the form specification 911 into an XML document that may be viewed and edited within the XML Source tab 912. The hierarchical structure of XML is very well suited to represent visual components of a user interface. The developer may use the visual features of the visual design module; alternatively, the developer may directly edit the XML document representing the current form.

By reference to FIG. 2, an embodiment comprises a deployment module 228. When the form specifications have been created during the visual design step 202, the developer proceeds to the define deployment step 206, interacting with the deployment module 228. The developer starts defining the platforms on which the application will run. Each platform may be characterized by:

The client device environment (e.g., the Java version, the device's profile).
A list of the form specifications deployed on the platform. Especially, some forms may not be deployed in all the platforms.
The involved servers.
The accessed databases and resources.

Platforms can also be added or modified at any time. When a new platform is added, the designer tool 200 updates the relevant data.

When the platforms have been defined, the developer requests the deployment module 228 to prepare the deployment of the platforms. The deployment module 228 analyzes the form specifications listed in the platforms, especially the scripts contained by the forms, and determines the involved abstract resources. A resource is either:

A form resource: a resource used during the construction process of the form. Since the construction process may be uniformly performed on the server or on the client device, the developer can consider performance issues when deciding where to locate the form resources.
Event resource: a resource used during the processing of an event of the form. Event processing is performed on the client device.

For each abstract resource determined during the preparation process, the developer defines a mapping to an actual resource. Therefore, the developer sets the type of the resource, its location and its properties. For example, if the resource is a database table, the settings may include a reference to a database resource and the name of the table. Some resource definitions may be shared by different elements in one form or across different forms. External resources may be defined only once and used anywhere in the application.

Once the deployment has been defined in the define deployment step 206, the developer proceeds to the export deployment step 210, using the deployment module 228 of the designer tool 200. When the developer requests the deployment module 228 to export the deployment, the designer tool 200 creates all the files required by the deployment and copies the files and the resources either to the client or to the server according to the deployment definition. Alternatively, the developer may export the required files to an intermediary storage, such as a local disk, and later copy them to the final target. On the client 238, the files to deploy include ready-to-deploy form specifications 216 and resources 218. On the server 236, the files to deploy include ready-to-deploy form specifications 220, resources 222 and the server configuration file 224. Several files and resources may be deployed, including images, queries or other resource files used by the application.

By reference to FIG. 2, an embodiment comprises a test module 244. After the deployment has been exported, the developer proceeds to test 240 the application. In accordance with one aspect, a process is provided to test applications on different platforms. Testing applications on small devices is a good way for the developer to get the real feeling of the user interface and to check the actual behavior of the application. The defined process promotes an iterative approach for testing. As discussed previously, the design step 202 can be performed only once for all the targeted platforms. To simplify the first testing iterations, the developer can define a test platform 242 on which to deploy the application, with the developer's desktop used as a client 238. The deployment may include a server 236 accessible from the desktop in order to simulate the real-world environment. The developer then tests the application on this platform 242. Once the functionalities are tested on the desktop test platform, the developer may proceed to test the application for each real targeted platform 242. In one embodiment, the designer tool 200 interacts with device emulators to proceed to test the application against specific devices. If the actual client device is connected to the developer's desktop, the designer tool 200 may deploy the required files directly on the device when the deployment function is run.

Figure 10B:
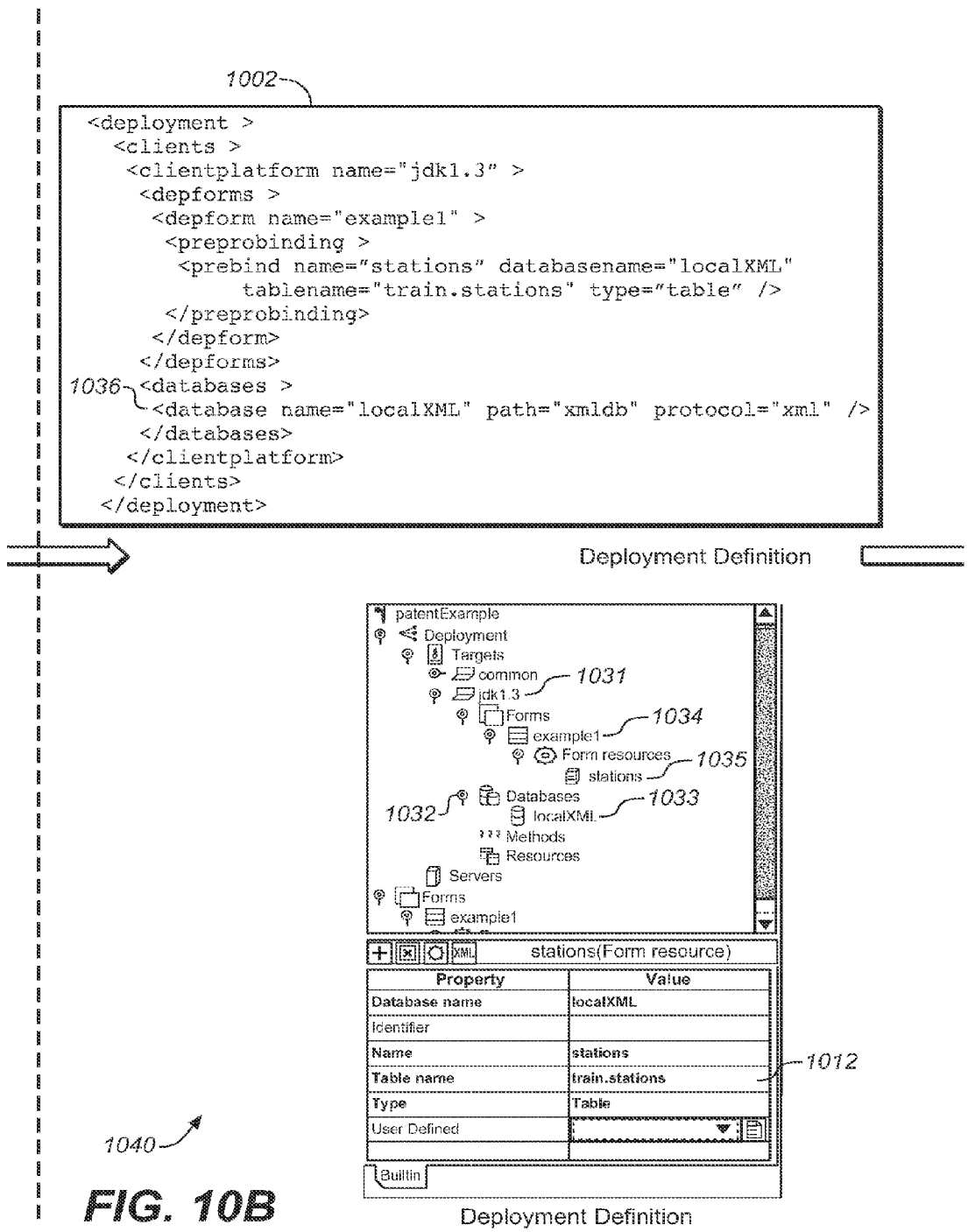
FIG. 10 illustrates embodiments of the markup based descriptors and corresponding screens displayed by embodiments of the present invention
Figure 10C:
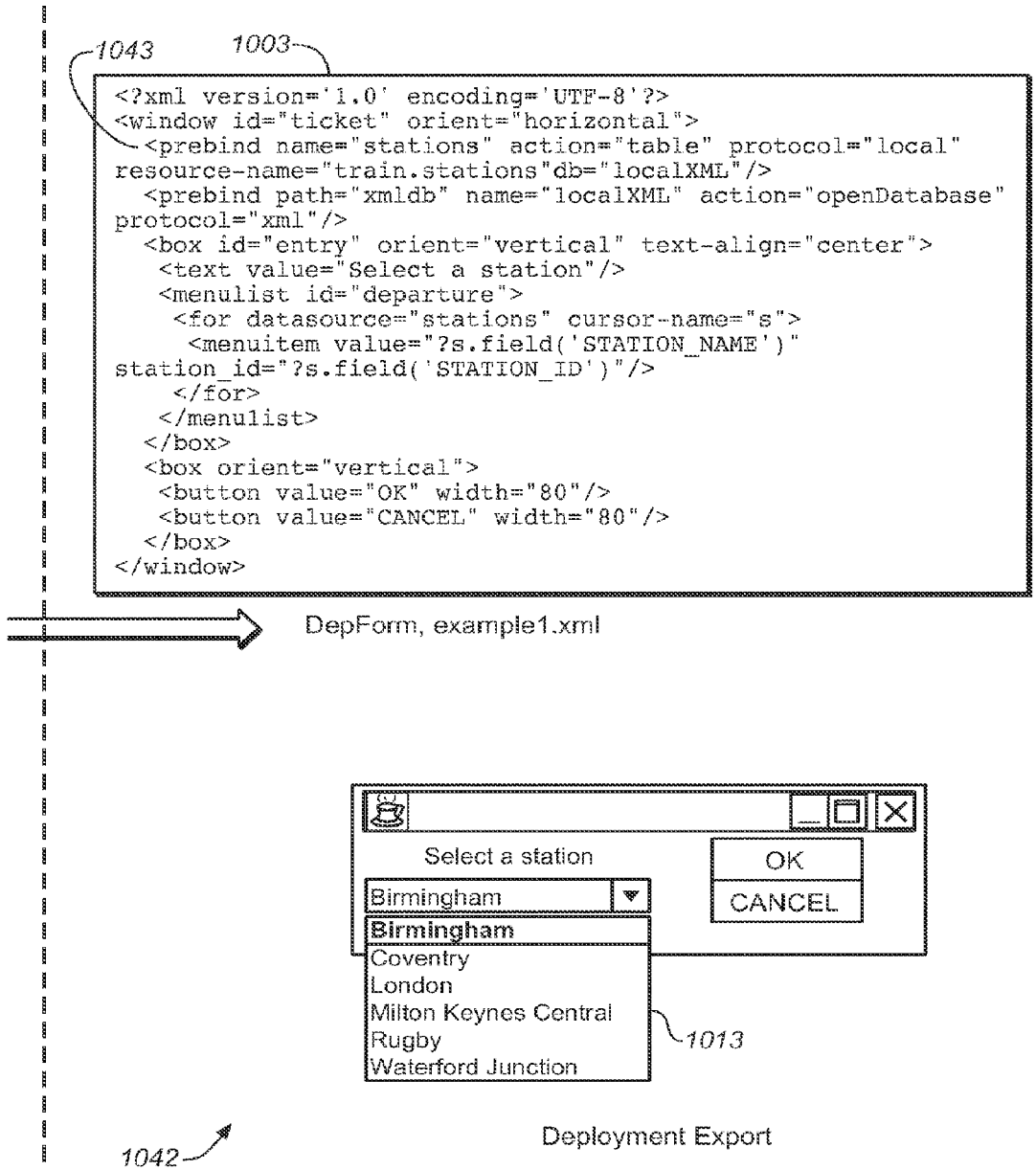

Embodiments of XML descriptors are now described by reference to FIG. 10. The XML syntax used in the different steps of the development process is described. The example illustrating the syntax is a simple window with a menulist containing a list of train stations extracted from a database.

During the visual design phase 1041, the developer visually defines the form 1011 and the designer tool generates the corresponding XML representation of the visual form specification 1001. Conversely, the developer may edit the XML representation 1001, and the designer tool will generate the corresponding form on the screen. In the example presented in FIG. 10, the visual components visible on the screen have corresponding elements in the shown descriptor example1.xml, for instance the menulist 1030. The XML tag <for> 1023 is used to fill the menulist 1030 with items extracted from a database. The tag represents a loop on each item retrieved from the data source, and the value of the attribute datasource="stations" 1021 names the source of the data to be used by this loop. This name is the name of the abstract resource representing the data source, and does not necessarily correspond to a physical database name. A mapping with an actual resource will be defined later. In the <for> declaration, the attribute cursor-name="s" 1024 defines the cursor object used within the loop to access the items retrieved from the database. Within the loop definition, the access to the item's content is performed through the syntax s.field('STATION_NAME') 1022, giving access to the STATION_NAME field of the current item.

To deploy the form, the developer first defines a deployment platform 1031, named jdk1.3 in the example, and adds the form 1034 example1 to this platform. The developer then launches the prepare deployment process on the designer tool. The designer analyzes the forms and finds in the form 1011, as a consequence of the value of the attribute 1021, an unknown abstract resource named stations 1035. This resource is listed as a Form Resource because it is used within a <for> declaration. At runtime, <for> declarations are used during the construction of the form, and not during the processing of an event. The properties of the deployment represented on the properties browser 1012 correspond to a deployment definition contained in the XML project file 1002. This file contains the list of the form specifications included in the project and the deployment definitions 1040 for the client and the server, and indicates all the resources used in the project.

The developer defines a database by adding an element 1033 under the databases 1032 element in the project browser. The developer defines properties of the added database by providing suitable values for the database component properties on the properties browser 1012, including the database's type and the settings for accessing the physical database. The corresponding syntax 1036 in the project file 1002 indicates that a database named localXML is located in a directory xmldb and corresponds to an XML file.

In order to bind the stations data-source to the localXML database, the developer sets the properties 1012 attached to the stations resource 1035 to the following values:

Type: Table. The resource is a database table

Database Name: localXML. Corresponds to the logical name of the database containing the table Table Name: train.stations. Corresponds to the physical name of the table in the database.

These settings are represented in the XML project file 1002 as: <prebind name="stations" databasename="localXML" tablename="train.stations" type="table"/>.

The next step is the export deployment step. During this step, the designer tool generates the ready-to-deploy form specification 1003. The designer tool combines the visual form specification 1001 with the contents of the project file 1002, thus binding the abstract resources contained in the form specification with the physical resources as specified during the deployment definition 1040. The binding syntax 1043 for the table is:

```
<prebind name="stations" action="table"
    protocol="local" resource-name="train.stations"
    db="localXML"/>
```

The prebind tag is used to define a binding for a resource used during the construction of the form and corresponds to a form resource. Conversely, a bind tag is used to define a binding for a resource used during the processing of an event and corresponds to an event resource. The associated properties are:

Name: the logical name of the resource

Action: designs the type of action to be performed by the runtime when processing the bind or prebind elements. In the example, the table value indicates that data must be retrieved from a database table. The possible values for this attribute and the corresponding actions are:

query: retrieve data by querying a database table: retrieve data from a database table method: access a Java method file: retrieve a text file or an XML file form: open a new form openDatabase: connect to a database resource-name: the name of the resource, database table in the example db: the logical name of the database One major issue affecting the user experience with mobile devices is the latency when moving from form to form within an application. This is due to the connection and transfer time for the forms, and the poor performance of the devices' processor. Embodiments provide additional capabilities, which may dramatically improve the perceptible performance of a mobile application.

Caching: If a form has been downloaded and processed by the device, the form remains in the device's memory as a processed form, and may be quickly and frequently accessed as required. The client runtime manages the list of loaded forms it can keep in memory, releasing cached forms as needed.

Pre-fetching: designated forms may be downloaded, processed by the device, and stored into the cache, during the idle time of the device's processor, even before the form has been explicitly requested by the user interaction within the application. Idle time typically occurs during user interaction. The client runtime may later access the form from the cache as required, without apparently incurring any download or processing time.

What is claimed is:

1. A non-transitory computer-readable storage medium comprising a computer program product for developing and deploying an application, the product comprising:
   a visual design module configured to define an abstract form specification of the application, wherein the abstract form specification comprises:
      an instruction to access a resource as an abstract reference, the abstract reference not identifying an actual resource;
      a markup-based descriptor language for defining a visual layout of a plurality of visual components of the application; and
      script code for defining an action to be performed in response to an event associated with a visual component of the plurality of visual components, wherein a physical location of the markup-based descriptor language for defining the visual layout of the plurality of visual components of the application and the script code for defining the action to be performed in response to the event associated with the visual component is different than a physical location of data resources for populating the visual layout; and
   a deployment module configured to define a deployment target for the application, wherein defining the deployment target for the application comprises mapping the abstract reference to an actual resource.

2. The non-transitory computer-readable storage medium of claim 1, wherein
   the action to be performed in response to the event comprises changing visual characteristics of a displayed visual form, displaying another visual form, or accessing resources.

3. The non-transitory computer-readable storage medium of claim 1, wherein the visual design module is further configured to store the abstract form specification in a markup-based descriptor language file.

4. The non-transitory computer-readable storage medium of claim 1, wherein defining the deployment target for the application further comprises:
   specifying a target platform associated with the deployment target, the target platform comprising a client device and a server; and
   specifying a deployment of the application between the client device and the server.

5. The non-transitory computer-readable storage medium of claim 4, wherein
   the deployment module is further configured to create a set of files and copy the set of files to at least one of the client device or the server according to the specified deployment of the application.

6. The non-transitory computer-readable storage medium of claim 4, wherein
   the product further comprises a test module for testing the application in the context of the target platform.

7. The non-transitory computer-readable storage medium of claim 1, wherein the deployment module is further configured to store data associated with the defining of the deployment target in a markup-based descriptor language project file.

8. The non-transitory computer-readable storage medium of claim 1, wherein the actual resource comprises at least one of database queries, multimedia streams and graphics, or script code.

9. A method for developing and deploying an application, the method comprising:
   defining an abstract form specification of the application, wherein the abstract form specification comprises:
      an instruction to access a resource as an abstract reference, the abstract reference not identifying an actual resource;
      a markup-based descriptor language for defining a visual layout of a plurality of visual components of the application; and
      script code for defining an action to be performed in response to an event associated with a visual component of the plurality of visual components, wherein a physical location of the markup-based descriptor language for defining the visual layout of the plurality of visual components of the application and the script code for defining the action to be performed in response to the event associated with the visual component is different than a physical location of data resources for populating the visual layout; and
   defining a deployment target for the application, wherein defining the deployment target for the application comprises mapping the abstract reference to an actual resource.

10. The method of claim 9, wherein the action to be performed in response to the event comprises changing visual characteristics of a displayed visual form, displaying another visual form, or accessing resources.

11. The method of claim 9 further comprising
   storing the abstract form specification in a markup-based descriptor language file.

12. The method of claim 9, wherein defining the deployment target for the application further comprises:
   specifying a target platform associated with the deployment target, the target platform comprising a client device and a server; and
   specifying a deployment of the application between the client device and the server.

13. The method of claim 12
   further comprising creating a set of files and copy the set of files to at least one of the client device or the server according to the specified deployment of the application.

14. The method of claim 12
   further comprising testing the application in the context of the target platform.

15. The method of claim 9
   further comprising storing data associated with the defining of the deployment target in a markup-based descriptor language project file.

16. The method of claim 9, wherein
   the actual resource comprises at least one of database queries, multimedia streams and graphics, or script code.

* * * * *